(12) United States Patent
Abe et al.

(10) Patent No.: US 9,257,242 B2
(45) Date of Patent: Feb. 9, 2016

(54) WORK VEHICLE (71) Applicant: KOMATSU LTD., Tokyo (JP)

(72) Inventors: Shinpei Abe, Komatsu (JP); Eiji Tsukuda, Komatsu (JP)

(73) Assignee: KOMATSU LTD., Tokyo (JP)

( * ) Notice: Subject to any disclaimer, the term of this patent is extended or adjusted under 35 U.S.C. 154(b) by 193 days.

(21) Appl. No.: 14/235,505

(22) PCT Filed: Aug. 8, 2013

(86) PCT No.: PCT/JP2013/071476
§ 371 (c)(1),
(2) Date: Jan. 28, 2014

(87) PCT Pub. No.: WO2014/174695
PCT Pub. Date: Oct. 30, 2014

(65) Prior Publication Data
US 2015/0299988 A1    Oct. 22, 2015

(30) Foreign Application Priority Data

Jul. 19, 2013 (JP) .................................. 2013-150461

(51) Int. Cl.
*H01H 9/28* (2006.01)
*E02F 9/24* (2006.01)
*E02F 9/16* (2006.01)
*B60N 2/005* (2006.01)
*B60K 26/00* (2006.01)
(Continued)

(52) U.S. Cl.
CPC ................ *H01H 9/287* (2013.01); *B60K 26/00* (2013.01); *B60N 2/005* (2013.01); *E02F 9/16* (2013.01); *E02F 9/2004* (2013.01); *E02F 9/2066* (2013.01); *E02F 9/24* (2013.01); *F02D 17/04* (2013.01); *F02D 29/02* (2013.01); *H01H 3/20* (2013.01); *H01H 9/286* (2013.01)

(58) Field of Classification Search
CPC combination set(s) only.
See application file for complete search history.

(56) References Cited

U.S. PATENT DOCUMENTS 2,348,393 A * 5/1944 Krieger .................. H01H 9/287
                                                            200/334
2,813,938 A * 11/1957 Speizman .............. H01H 9/286
                                                            200/333

(Continued)

FOREIGN PATENT DOCUMENTS

CN    201845671 U    5/2011
CN    102535565 A    7/2012
(Continued)

*Primary Examiner* — Nicole Verley
(74) *Attorney, Agent, or Firm* — Drinker Biddle & Reath LLP (57) ABSTRACT

An operation unit cover moves between a position of covering an operation lever and a position of exposing the operation lever and holding the operation lever at a first operational position while being at the position of covering. A housing covers lateral sides and a top side of a case that cross a front side of the case and exposes the operation unit cover from the front side. A pivoting member pivots about a pivoting member's pivot shaft located above the operation unit cover, between a closed position of covering the operation unit cover and an opened position of exposing the operation unit cover and, while the pivoting member is at the closed position, the pivoting member forms a closed space between the pivoting member and the housing for accommodating at least the operation unit cover and holds the operation unit cover at the position of covering the operation lever.

6 Claims, 9 Drawing Sheets (51) Int. Cl.
*E02F 9/20* (2006.01)
*F02D 29/02* (2006.01)
*F02D 17/04* (2006.01)
*H01H 3/20* (2006.01)

(56) References Cited

U.S. PATENT DOCUMENTS

| | | | | |
|---|---|---|---|---|
| 3,096,409 | A | * | 7/1963 | Hubbell .................. H01H 3/20 174/67 |
| 3,194,208 | A | * | 7/1965 | Kramer .................... G09F 3/04 116/205 |
| 4,979,634 | A | * | 12/1990 | Begley .................. H01H 9/287 16/267 |
| 7,408,476 | B1 | * | 8/2008 | Beaton .................... H01H 9/287 340/426.24 |
| 8,835,781 | B2 | * | 9/2014 | Dixon .................... H01H 9/287 200/43.16 |
| 2013/0207797 | A1 | | 8/2013 | Shimazu et al. |

FOREIGN PATENT DOCUMENTS

| | | | |
|---|---|---|---|
| CN | 202601953 U | 12/2012 | |
| DE | 621536 C | * 11/1935 | ............. H01H 9/287 |
| DE | 3623636 A1 | * 1/1988 | ............. H01H 21/22 |
| DE | 112011100707 | 1/2013 | |
| JP | 2002-042630 A | 2/2002 | |
| JP | 2008-248627 A | 10/2008 | |
| JP | 2012-132242 A | 7/2012 | |

\* cited by examiner

WORK VEHICLE

TECHNICAL FIELD

The present invention relates to a work vehicle, and particularly to a work vehicle equipped with an engine-stop switch device.

BACKGROUND ART

Generally, a work vehicle is equipped with a stop switch device capable of stopping an engine in an emergency, separately from a key switch. Such a stop switch device is disclosed for example in Japanese Patent Laying-Open No. 2012-132242.

For the stop switch device disclosed in the above-referenced publication, a cover is provided to cover an operation unit of the switch device, in order to prevent the stop switch device from being erroneously operated. For the stop switch device to be operated, it is necessary to open the cover and thereby expose the operation unit and then shift the operation unit to an operational position which causes the engine to stop. The cover is configured in such a manner that shifts the operation unit to an operational position which permits the engine to start, through a transition of the cover from the state where the cover is opened to expose the operation unit to the state where the cover is closed to cover the operation unit. Therefore, in the state where the cover is closed to cover the operation unit, the stop switch device is kept in the state which permits the engine to start.

CITATION LIST

Patent Document

PTD 1: Japanese Patent Laying-Open No. 2012-132242

SUMMARY OF INVENTION

Technical Problem

Regarding the stop switch device disclosed in the above-referenced publication, however, there may be the case where the cover, which has been opened to shift the operation unit to the operational position which causes the engine to stop, is forgotten to be closed. In this case, if the work vehicle is of the canopy type, the operation unit of the stop switch exposed from the cover may get wet in the rain.

Moreover, in the case where the cover is forgotten to be closed, the operation unit is still at the operational position which causes the engine to stop, and therefore, the state where start of the engine is inhibited is maintained. Thus, even when an operator turns on the key switch for re-starting the work vehicle, the engine is not started and accordingly the vehicle may be mistakenly identified as malfunctioning.

The present invention has been made in view of the above problems, and an object of the invention is to provide a work vehicle in which the operation unit can be prevented from getting wet in the rain and for which the work vehicle can be prevented from being mistakenly identified as malfunctioning.

Solution to Problem

A work vehicle of the present invention includes an engine and an engine-stop switch device of the work vehicle configured to stop the engine from operating. The engine-stop switch device includes a case, an operation unit, an operation unit cover, a housing, and a pivoting member. The operation unit is attached to the case and moves, at a front side of the case, between a first operational position of permitting the engine to start and a second operational position of stopping the engine from operating and inhibiting the engine from starting. The operation unit cover moves between a position of covering the operation unit and a position of exposing the operation unit, and holds the operation unit at the first operational position while the operation unit cover is at the position of covering the operation unit. The housing covers lateral sides and a top side of the case that cross the front side of the case and exposes the operation unit cover from the front side. The pivoting member pivots about a pivoting member's pivot shaft located above the operation unit cover, between a closed position of covering the operation unit cover and an opened position of exposing the operation unit cover and, while the pivoting member is at the closed position, the pivoting member forms a closed space, between the pivoting member and the housing, for accommodating at least the operation unit cover in the closed space and holds the operation unit cover at the position of covering the operation unit.

In the work vehicle of the present invention, the pivoting member pivots about the pivoting member's pivot shaft which is located above the operation unit cover. Therefore, even when the pivoting member is set at its opened position, the pivoting member can automatically be moved by its own weight to its closed position. Thus, even when the pivoting member is set at its opened position and the operation unit is exposed from the operation unit cover and shifted to the second operational position to stop the engine from operating, the pivoting member can automatically be moved to its closed position after the operation unit is shifted.

In the state where the pivoting member is at its closed position, the closed space is formed between the pivoting member and the housing for accommodating at least the operation unit cover therein and the housing covers the lateral sides and the top side of the case. Accordingly, the operation unit can be prevented from getting wet in the rain.

Moreover, with both the pivoting member and the operation unit cover opened, the operation unit can be shifted to the second operational position to stop the engine from operating. In this state, the engine is inhibited from starting. The pivoting member, however, is automatically closed so that the operation unit cover is held at the position of covering the operation unit, and the operation unit cover in turn holds the operation unit at the first operational position. At this first operational position, the engine is permitted to start. Namely, even when the operation unit is set in the state of inhibiting the engine from starting, the pivoting member is automatically set at its closed position to shift the operation unit to the state of permitting the engine to start. Thus, in response to operator's operation of turning on the key switch, the engine is started, and therefore, the work vehicle will not be mistakenly identified as malfunctioning.

In the work vehicle, the pivoting member at its position of opening to a maximum extent for exposing the operation unit cover protrudes in a direction of the front side and inclines with respect to a vertical line extending across the pivoting member's pivot shaft, as seen in a side view.

Accordingly, even when the pivoting member is at its position of opening to a maximum extent for exposing the operation unit cover, the pivoting member is pivoted automatically by its own weight to the closed position.

In the work vehicle, the pivoting member has an inner surface which is located opposite to the operation unit while the pivoting member is at the closed position. The inner surface has a slide portion where the operation unit cover slides while the pivoting member is pivoted from the opened position to the closed position.

Accordingly, as the pivoting member is pivoted from the opened position to the closed position, the operation unit cover can also be moved from the position of exposing the operation unit to the position of covering the operation unit while sliding along the pivoting member.

In the work vehicle, the inner surface has a flat surface which is the slide portion, and an elastic member located at a position closer to the pivoting member's pivot shaft relative to the slide portion. The elastic member contacts the operation unit cover while being at the closed position.

Thus, the slide portion can be provided in the form of the flat surface to reduce the resistance while the cover is sliding along the slide portion. In addition, since the position of the elastic member is closer to the pivoting member's pivot shaft relative to the position of the slide portion, the elastic member can contact the operation unit cover when the pivoting member has been pivoted to its closed position. Thus, in the state where the pivoting member is at the position of being closed, the operation unit cover can be pressurized with the elastic force of the elastic member and accordingly the operation unit cover can be prevented from rattling.

In the work vehicle, the pivoting member is shaped to externally enclose the front side of lateral surfaces and the front side of a bottom portion of the housing while being at the closed position.

Accordingly, moisture can more effectively be prevented from entering the closed space in which at least the operation unit cover is accommodated.

The work vehicle further includes a driver seat and a canopy covering from above the engine-stop switch device and the driver seat.

Since the driver seat is thus covered from above by the canopy, the operation unit can be prevented from getting wet in the rain even in a work vehicle in which the engine-stop switch device is likely to get wet in the rain.

Advantageous Effects of Invention

As seen from the foregoing, the present invention can achieve an engine-stop switch device and a work vehicle capable of preventing the operation unit from getting wet in the rain and preventing mistake in identification of the operation.

DESCRIPTION OF EMBODIMENTS

In the following, an embodiment of the present invention will be described based on the drawings.

First, a configuration of a wheel loader given as an example of a work vehicle in a first embodiment of the present invention will be described with reference to FIGS. 1 and 2. The present invention, however, is also applicable to work vehicles such as hydraulic shovel, bulldozer, and the like.

Figure 1:
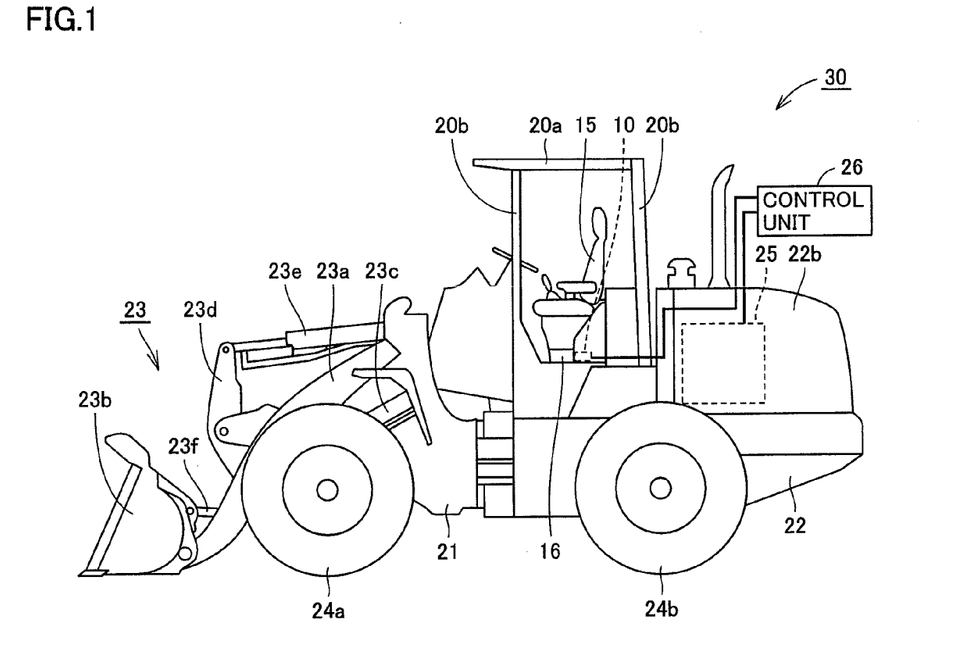
FIG. 1 is a side view schematically showing a configuration of a work vehicle equipped with an engine-stop switch device in an embodiment of the present invention.

Referring to FIG. 1, a wheel loader 30 in the present embodiment mainly includes a front frame 21, a rear body 22, a work implement 23, an engine 25, an engine-stop switch device 10, and a control unit 26. To both lateral sides of front frame 21, front wheels 24a are attached. To both lateral sides of rear body 22, rear wheels 24b are attached.

Front frame 21 and rear body 22 are attached to each other by a center pin (not shown) in such a manner that allows them to laterally swing relative to each other, and thus form an articulated structure. Namely, front frame 21 and rear body 22 are coupled together by a pair of right and left steering cylinders (not shown). The right and left steering cylinders are configured to be extended and shortened to allow front frame 21 and rear body 22 to laterally swing relative to each other about the center pin and steer. These front frame 21 and rear body 22 constitute the body of wheel loader 30.

To front frame 21, work implement 23 is attached. Work implement 23 includes a boom 23a having its proximal end attached to front frame 21 in such a manner that allows boom 23a to swing, and a bucket 23b attached to the distal end of boom 23a in such a manner that allows bucket 23b to swing. Front frame 21 and boom 23a are coupled together by a pair of boom cylinders 23c. The pair of boom cylinders 23c are configured to be extended and shortened to allow boom 23a to swing.

Work implement 23 also includes: a bell crank 23d supported, at a substantially central position of the work implement, on boom 23a in such a manner that allows bell crank 23d to swing; a bucket cylinder 23e coupling the proximal end of bell crank 23d and front frame 21 together; and a link 23f coupling the distal end of bell crank 23d and bucket 23b together. Bucket cylinder 23e is extended and shortened to allow bucket 23b to swing.

In a rear portion of rear body 22, an engine compartment 22b is disposed. In this engine compartment 22b, engine 25 is disposed. On the front side with respect to engine compartment 22b, a driver seat 15 is disposed for an operator to sit thereon for operating wheel loader 30.

Driver seat 15 is covered from above by a canopy 20a. This canopy 20a is supported on rear body 22 through four poles 20b. Between the front and rear poles 20b along the lateral sides of driver seat 15 (right and left sides with respect to an operator sitting on the driver seat), no door or windowpane is provided. Between the right and left poles 20b along the front side of the driver seat (front side with respect to an operator sitting on the driver seat), no windowpane is provided as well.

Engine-stop switch device 10 is a switch device capable of causing engine 25 to stop in an emergency and provided separately from a key switch. Engine-stop switch device 10 is actuated to stop engine 25, when the key switch is turned off and accordingly electric power is stopped from being fed. Specifically, engine-stop switch device 10 switches between a first operational state for permitting engine 25 to start and a second operational state for stopping engine 25 from operating and inhibiting engine 25 from starting.

Engine-stop switch device 10 is connected through control unit 26 to engine 25. Control unit 26 is used for controlling the operation of engine 25, based on switching of engine-stop switch device 10.

Specifically, when engine-stop switch device 10 is switched to the first operational state, control unit 26 controls engine 25 in such a manner for example that enables fuel or intake air to be fed to an engine piston of engine 25, to thereby produce a condition under which engine 25 can be started. When engine-stop switch device 10 is switched to the second operational state, control unit 26 controls engine 25 in such a manner for example that stops fuel or intake air from being fed to the engine piston of engine 25, to thereby stop engine 25 and keep engine 25 stopped.

Control unit 26 is shown in FIG. 1 to be spaced apart from the body of wheel loader 30 for the sake of convenience of illustration in the drawing. Actually, however, control unit 26 is attached to the body of the wheel loader.

Figure 2:
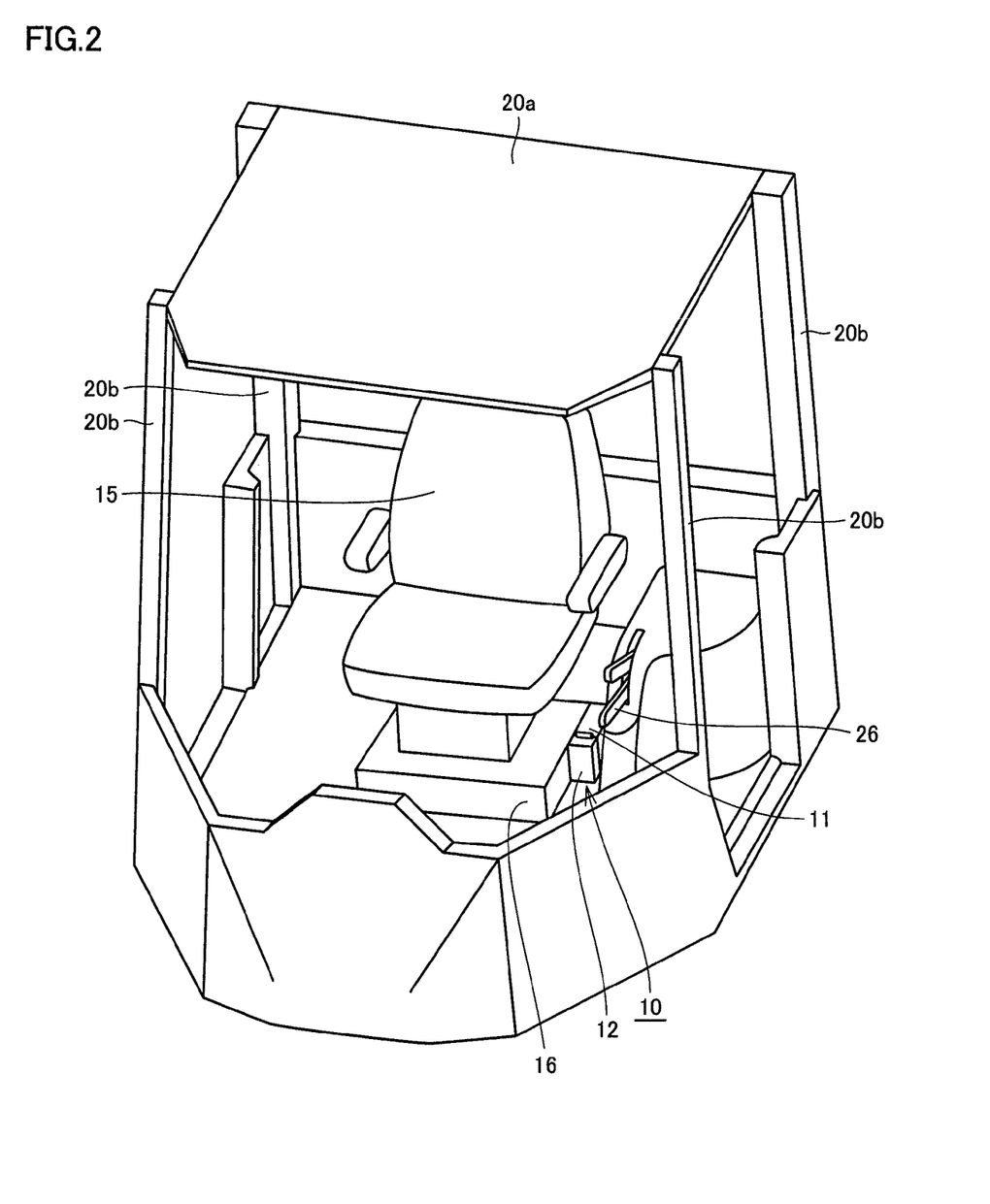
FIG. 2 is a perspective view schematically showing a configuration of a driver sheet and its surrounding in the work vehicle equipped with the engine-stop switch device in an embodiment of the present invention.

Referring to FIG. 2, engine-stop switch device 10 is disposed for example at a position which is located laterally below driver seat 15 and covered from above by canopy 20a. This engine-stop switch device 10 is arranged for example between driver seat 15 and an operation lever 26 such as hand parking brake and on the floor on which driver seat 15 is disposed. In addition, engine-stop switch device 10 is arranged backward relative to the front end of a driver seat platform 16 on which driver seat 15 is mounted. Thus, engine-stop switch device 10 is disposed at the position that prevents the engine-stop switch device from being touched by an operator's foot or the like when the operator gets on or off driver seat 15 and that facilitates the operator's operation of stopping engine 25 in an emergency.

Next, a configuration of engine-stop switch device 10 in the present embodiment that is attached to the above-described work vehicle will be described with reference to FIGS. 3 to 6.

Figure 3:
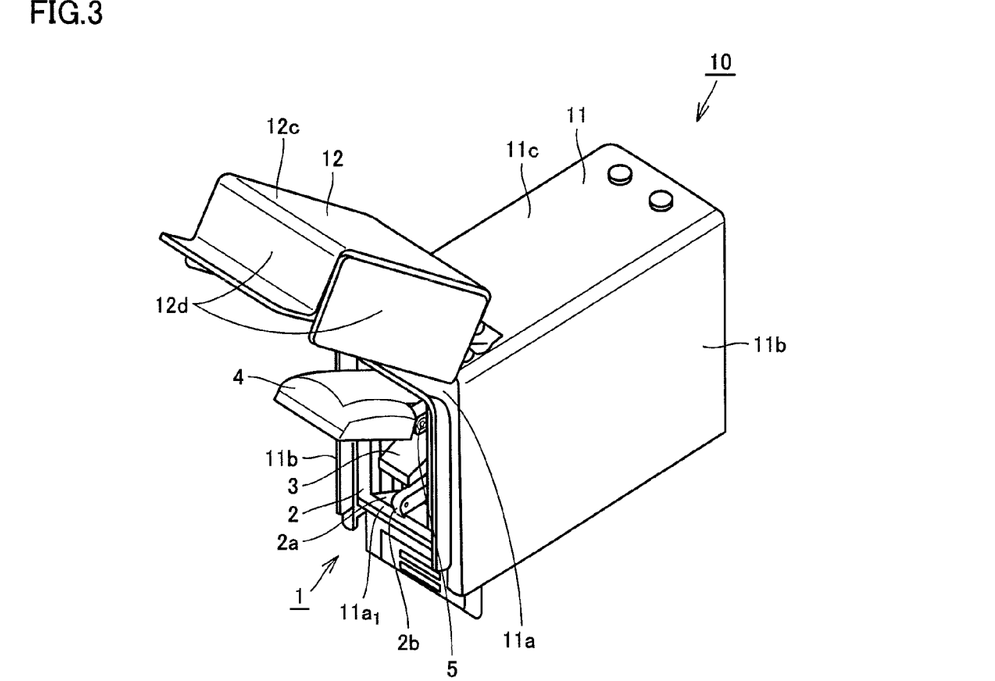
FIG. 3 is a front top oblique perspective view schematically showing a configuration of the engine-stop switch device in an embodiment of the present invention.
Figure 4:
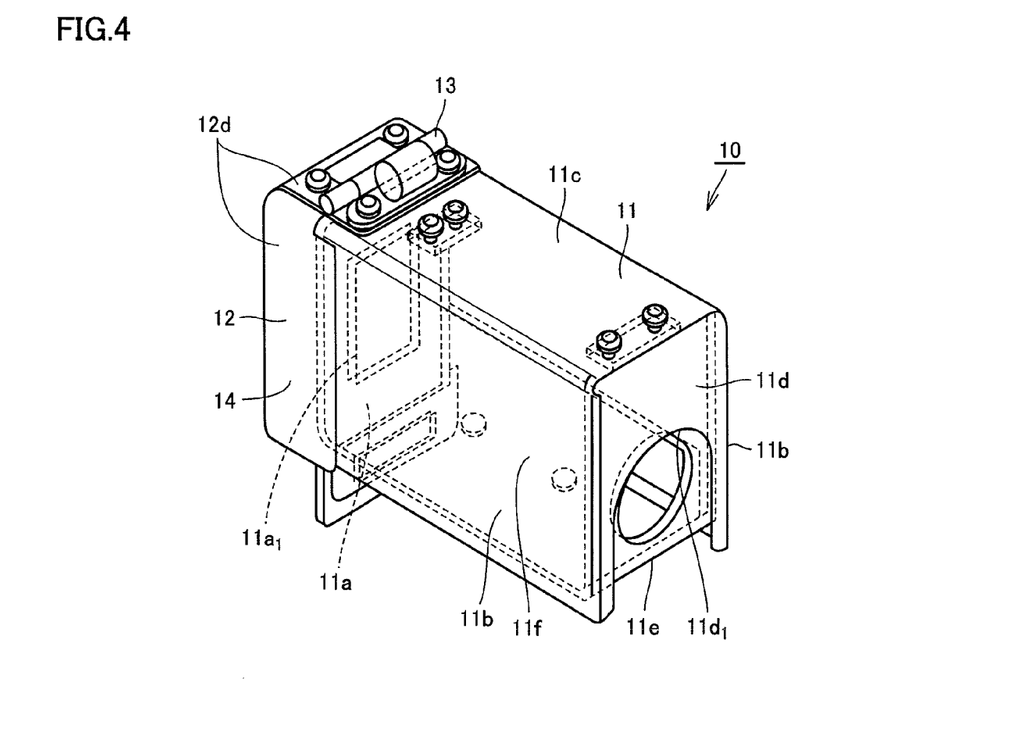
FIG. 4 is a rear top oblique perspective view schematically showing the configuration of the engine-stop switch device in an embodiment of the present invention.

Referring to FIGS. 3 and 4, engine-stop switch device 10 mainly includes a switch body 1, a housing 11, a pivoting member 12, and a pivoting member's pivot shaft 13. Switch body 1 is a portion where the first operational state and the second operational state as described above are switched to each other. Housing 11 houses switch body 1 therein in such a manner that allows an operation unit cover 4 of switch body 1 to be exposed from housing 11. Pivoting member 12 is supported on housing 11 in such a manner that enables pivoting member 12 to pivot between a position where the pivoting member is closed to cover operation unit cover 4 of switch body 1 which is exposed from housing 11, and a position where the pivoting member is opened to expose operation unit cover 4. In the following, a configuration of each part will be described in detail.

Figure 5:
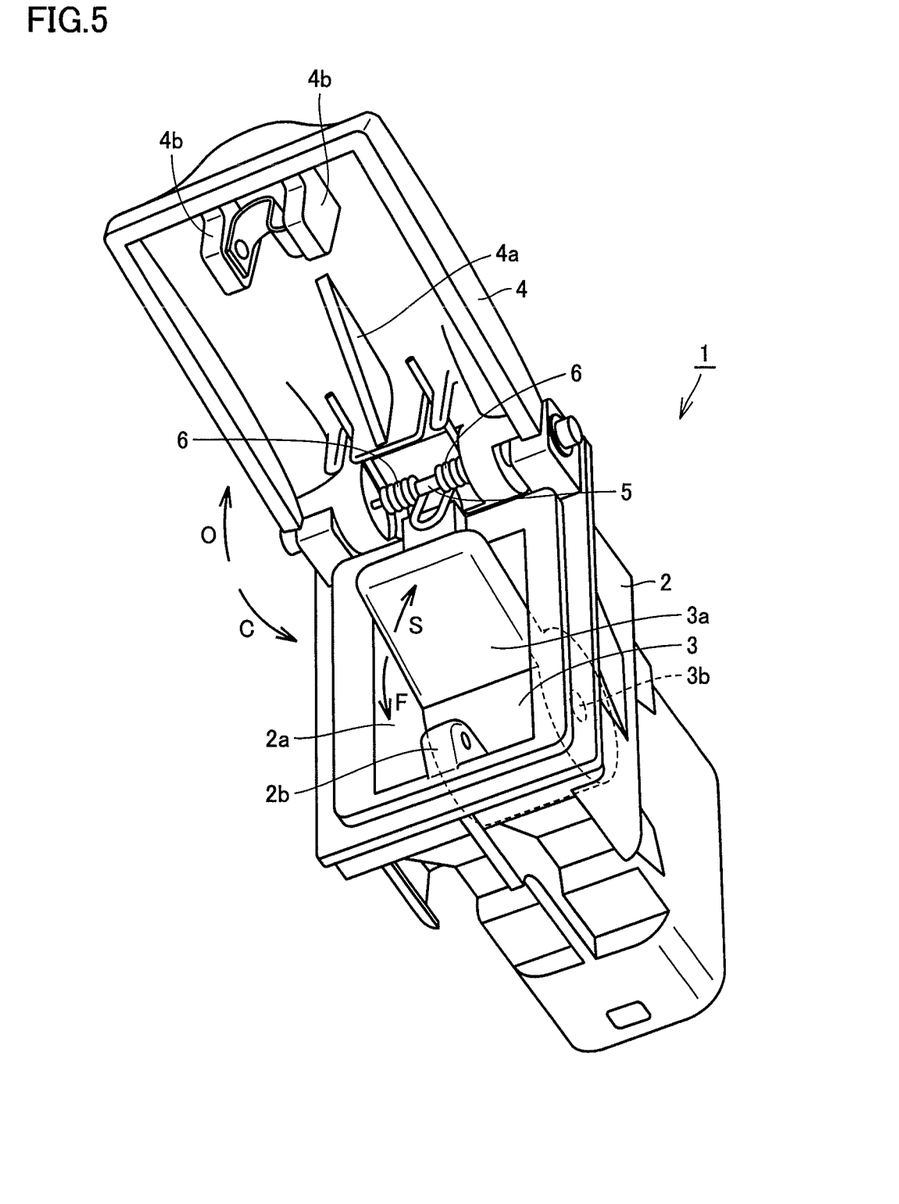
FIG. 5 is a front bottom oblique perspective view schematically showing a configuration of a switch body of the engine-stop switch device in an embodiment of the present invention.

Referring to FIG. 5, switch body 1 mainly includes a case 2, an operation lever (operation unit) 3, operation unit cover 4, a cover's pivot shaft 5, and a torsion coil spring 6. Case 2 has a space therein, and this space has an opening 2a along the front side of case 2. Case 2 has a locking protrusion 2b on the lower end of opening 2a.

Operation lever 3 is attached in the internal space of case 2. This operation lever 3 has a tab 3a which is a portion to be operated by an operator. This tab 3a is exposed from opening 2a of the front side of case 2.

Tab 3a of operation lever 3 is pivotable for example in the direction of an arrow F or the direction of an arrow S about an operation lever's pivot 3b, with respect to case 2. Tab 3a of operation lever 3 can be pivoted in the above-described manner to move, at the front side of case 2, between a first operational position (the position where the tab has been pivoted in the direction of arrow F) and a second operational position (the position where the tab has been pivoted in the direction of arrow S). The first operational position is an operational position permitting engine 25 to start, and the second operational position is an operational position stopping engine 25 from operating and inhibiting the engine from starting.

Operation unit cover 4 is attached to case 2 in such a manner that enables the cover to pivot in the direction of an arrow C or the direction of an arrow O about cover's pivot shaft 5, with respect to case 2. The cover can be pivoted in the above-described manner to move operation lever 3 between the position where operation lever 3 is covered (the position where it has been pivoted in the direction of arrow C) and the position where operation lever 3 is exposed (the position where it has been pivoted in the direction of arrow O).

Cover's pivot shaft 5 is located above operation lever 3. Thus, operation unit cover 4 is supported on case 2 so that the cover is opened upward. Cover's pivot shaft 5 is inserted in a coil portion of torsion coil spring 6. Torsion coil spring 6 biases operation unit cover 4 toward the position that causes operation lever 3 to be exposed (in the direction of arrow O), with respect to case 2.

On an inner surface of operation unit cover 4, a locking catch 4b having a metal fitting (lock spring) is provided. Locking catch 4b is configured to laterally catch locking protrusion 2b therein while operation unit cover 4 is positioned to cover operation lever 3. Locking catch 4b and locking protrusion 2b can engage each other to lock operation unit cover 4 on case 2, at the position where the cover covers operation lever 3.

In addition, on the inner surface of operation unit cover 4, a sloped protrusion 4a is formed. This sloped protrusion 4a is configured so that the level of the slope increases toward cover's pivot shaft 5. Sloped protrusion 4a is configured to touch tab 3a of operation lever 3 while operation unit cover 4 is pivoted, with respect to case 2, from the position where the operation lever 3 is exposed to the position where operation lever 3 is covered, so that tab 3a is pivoted from the second operational position to the first operational position as described above. Accordingly, operation unit cover 4 can keep tab 3a at the first operational position while the cover is at the position of covering operation lever 3.

Referring to FIGS. 3 and 4, housing 11 has an internal space 11f (FIG. 4), and has a front wall 11a, two sidewalls 11b, 11b, a top wall 11c, a rear wall 11d, and a bottom wall 11e that enclose internal space 11f. Front wall 11a and rear wall 11d have respective holes $11a_1$ and $11d_1$ formed therein.

Switch body 1 is housed within internal space 11f of housing 11. Operation unit cover 4 of switch body 1 is exposed from hole $11a_1$ of front wall 11a of housing 11. Namely, housing 11 covers both lateral sides, the top side, and the bottom side of case 2 of switch body 1 that extend in respective planes which cross the plane of the front side of case 2, as well as the rear side thereof, and exposes, at the front side, operation unit cover 4 of switch body 1. While operation unit cover 4 of switch body 1 is exposed from hole $11a_1$, operation unit cover 4 is movable between the position of covering operation lever 3 (the position where the cover has been pivoted in the direction of arrow C) and the position of exposing operation lever 3 (the position where the cover has been pivoted in the direction of arrow O) as shown in FIG. 5.

Pivoting member 12 is supported on housing 11 in such a manner that enables pivoting member 12 to pivot about pivoting member's pivot shaft 13 with respect to housing 11. Pivoting member's pivot shaft 13 is located above operation unit cover 4 of switch body 1. Thus, pivoting member 12 is supported on housing 11 so that the pivoting member is opened upward. Pivoting member 12 can thus be pivoted between the closed position of covering operation unit cover 4 of switch body 1 and the opened position of exposing operation unit cover 4.

Pivoting member 12 is configured so that pivoting member 12 at the above-described closed position forms, between the pivoting member and housing 11, a closed space in which at least operation unit cover 4 of switch body 1 is accommodated. The closed space is formed by a space 14 defined by front wall 11a of housing 11 shown in FIG. 3 and the inner wall of pivoting member 12.

The aforementioned closed space means that space 14 is marked off from housing 11 and from the external space around pivoting member 12 and is configured in such a manner that prevents rain falling through the external space from directly entering space 14 and also prevents rain splashing up from the surface (surface of the floor) on which the device is mounted from entering space 14. Thus, as long as space 14 is closed to the extent that allows space 14 to be marked off from the external space by housing 11 and pivoting member 12, there may be a certain gap which communicates with both space 14 and the external space.

Pivoting member 12 is preferably shaped in such a manner that allows pivoting member 12 at its closed position to externally enclose the front side of the two lateral surfaces and the front side of the bottom portion of housing 11. Specifically, it is preferable that pivoting member 12 has a flat plate portion 12c and a frame portion 12d surrounding the perimeter of flat plate portion 12c and this frame portion 12d at the closed position externally encloses the front side of the two lateral surfaces and the front side of the bottom portion of housing 11.

Hole $11d_1$ of rear wall 11d of housing 11 is provided for passing a wire or the like which is connected to an electrical contact of operation lever 3.

Figure 6:
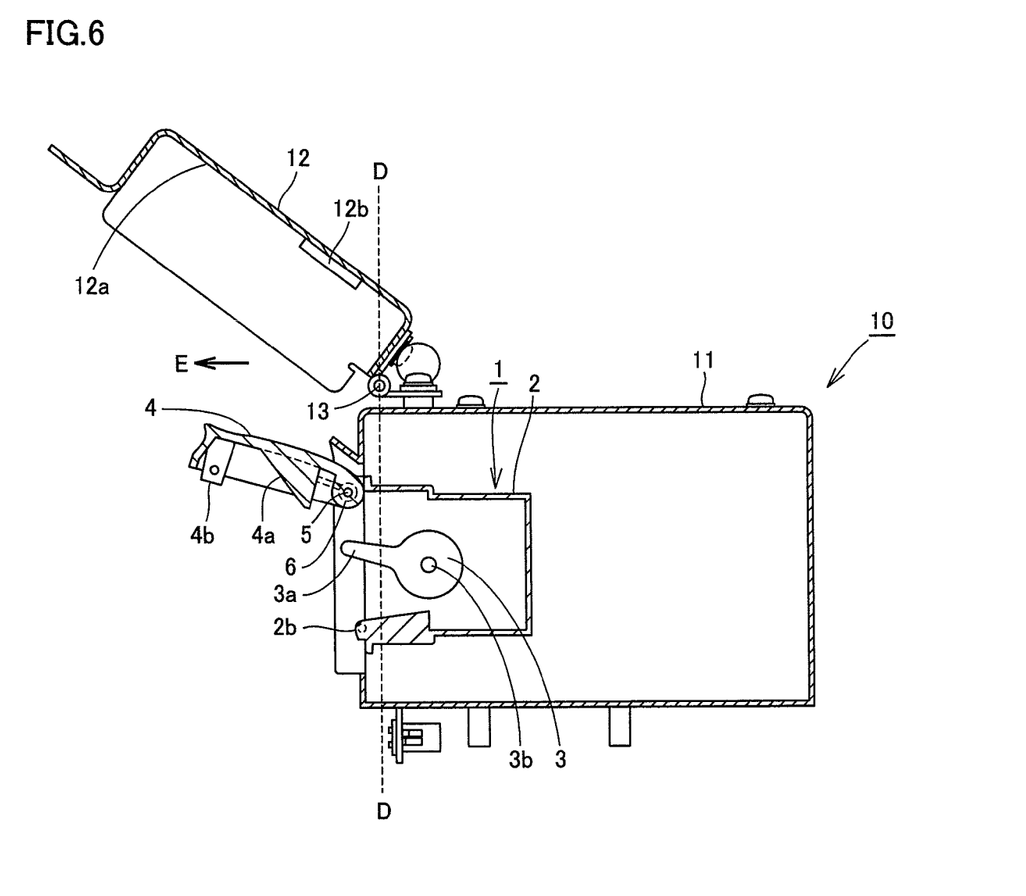
FIG. 6 is a side schematic view showing a first step of a series of steps for operating the engine-stop switch device in an embodiment of the present invention.

Referring to FIG. 6, pivoting member 12 has an inner surface which is located opposite to operation unit cover 4 and operation lever 3 of switch body 1 when pivoting member 12 is at its closed position. The inner surface has a slide portion 12a along which operation unit cover 4 of switch body 1 slides while pivoting member 12 is pivoted from its opened position to its closed position. Slide portion 12a is preferably a flat surface.

Preferably, the inner surface of pivoting member 12 further has an elastic member 12b located at a position closer to pivoting member's pivot shaft 13 as compared with the position of the flat surface which is slide portion 12a. Elastic member 12b is a rubber sheet, for example.

While pivoting member 12 is pivoted from its opened position to its closed position, flat surface 12a and elastic member 12b push and thereby pivot operation unit cover 4 of switch body 1. Therefore, when pivoting member 12 reaches its closed position, operation unit cover 4 is held at a position covering operation lever 3.

Pivoting member 12 which has been opened to its maximum for exposing operation unit cover 4 is inclined in the form of protruding frontward (in the direction of arrow E) as seen in a side view, with respect to a vertical line D extending across pivoting member's pivot shaft 13. Accordingly, even when pivoting member 12 is opened to its maximum, pivoting member 12 can automatically be pivoted by its own weight from the opened position to the closed position, with respect to housing 11.

Next, a series of steps for operating engine-stop switch device 10 in the present embodiment will be described with reference to FIGS. 6 to 12.

Referring to FIG. 6, when engine 25 is to be stopped from operating by means of engine-stop switch device 10, an operator opens pivoting member 12 to expose operation unit cover 4, and then also opens the exposed operation unit cover 4. At this time, in response to disengagement of locking catch 4b and locking protrusion 2b from each other, operation unit cover 4 is automatically pivoted by the biasing force of torsion coil spring 6 to the position of exposing tab 3a of operation lever 3.

Subsequently, the operator shifts the exposed tab 3a of operation lever 3 from the first operational position to the second operational position as described above. Accordingly, as shown in FIG. 1, an engine stop signal is output from engine-stop switch device 10 to cause control unit 26 to control engine 25 so that engine 25 is stopped. In this way, engine 25 can be stopped from operating in an emergency. In this state, engine 25 is inhibited from starting.

In this state, pivoting member 12 is at its position of opening to the maximum extent. When pivoting member 12 is at its position of opening to the maximum extent, pivoting member 12 is automatically pivoted by its own weight from its opened position to its closed position with respect to housing 11.

Figure 7:
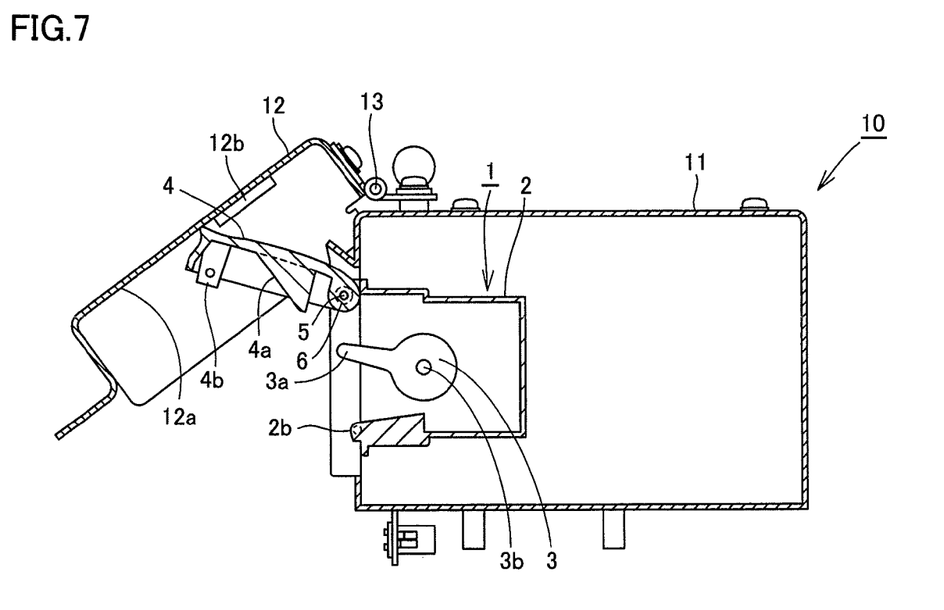
FIG. 7 is a side schematic view showing a second step of a series of steps for operating the engine-stop switch device in an embodiment of the present invention.

Referring to FIG. 7, while pivoting member 12 is pivoted from its state of opening to the maximum extent to its closed state, flat surface (slide surface) 12a of the inner surface of pivoting member 12 is brought into contact with operation unit cover 4 of switch body 1.

Figure 8:
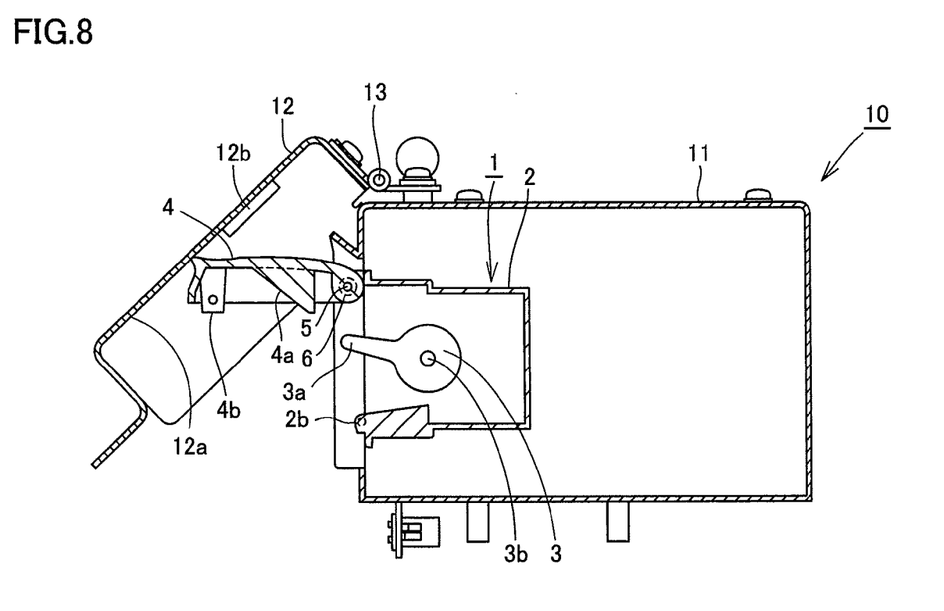
FIG. 8 is a side schematic view showing a third step of a series of steps for operating the engine-stop switch device in an embodiment of the present invention.

Referring to FIG. 8, as pivoting member 12 is pivoted, operation unit cover 4 slides along flat surface 12a of pivoting member 12. At this time, operation unit cover 4 is pivoted against the biasing force of torsion coil spring 6, from its position of exposing operation lever 3 toward the position of covering operation lever 3.

Figure 9:
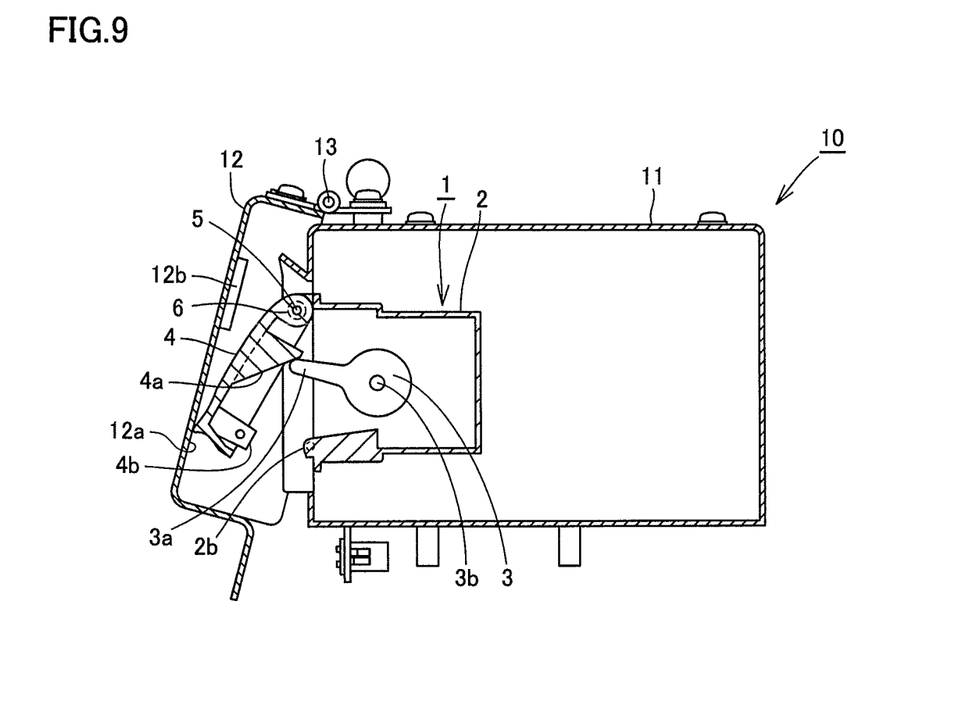
FIG. 9 is a side schematic view showing a fourth step of a series of steps for operating the engine-stop switch device in an embodiment of the present invention.

Referring to FIG. 9, operation unit cover 4 is further pushed and thereby pivoted by pivoting member 12 toward the position of covering operation lever 3, and accordingly the slope of sloped protrusion 4a of operation unit cover 4 contacts tab 3a of operation lever 3.

Figure 10:
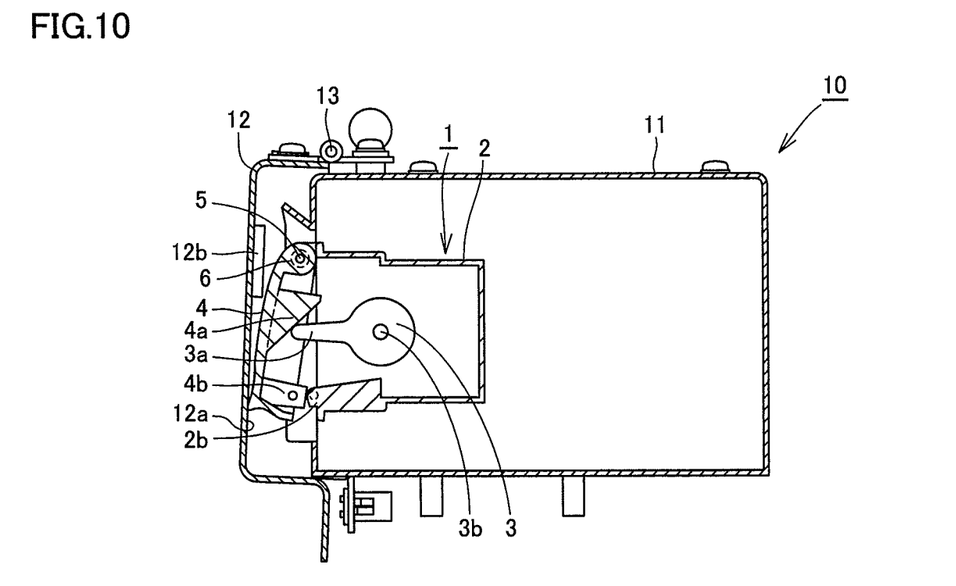
FIG. 10 is a side schematic view showing a fifth step of a series of steps for operating the engine-stop switch device in an embodiment of the present invention.

Referring to FIG. 10, while pivoting member 12 and operation unit cover 4 are pivoting, tab 3a of operation lever 3 slides along the slope of sloped protrusion 4a of operation unit cover 4. Accordingly, tab 3a is pivoted from the aforementioned second operational position toward the first operational position.

Figure 11:
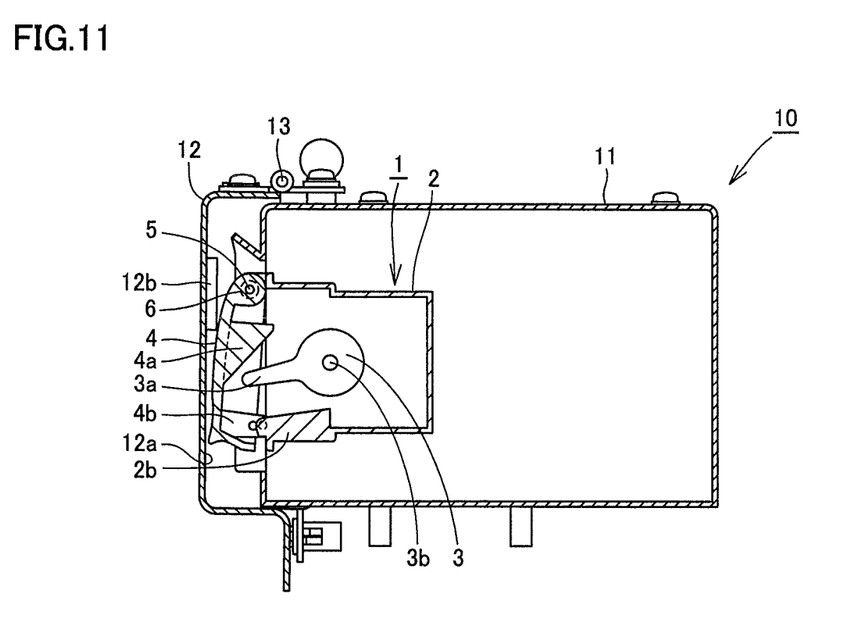
FIG. 11 is a side schematic view showing a sixth step of a series of steps for operating the engine-stop switch device in an embodiment of the present invention.

Referring to FIG. 11, operation unit cover 4 is further pushed and thereby pivoted by pivoting member 12 toward the position of covering operation lever 3, and accordingly elastic member 12b of pivoting member 12 contacts operation unit cover 4 and elastic member 12b pressurizes operation unit cover 4.

Figure 12:
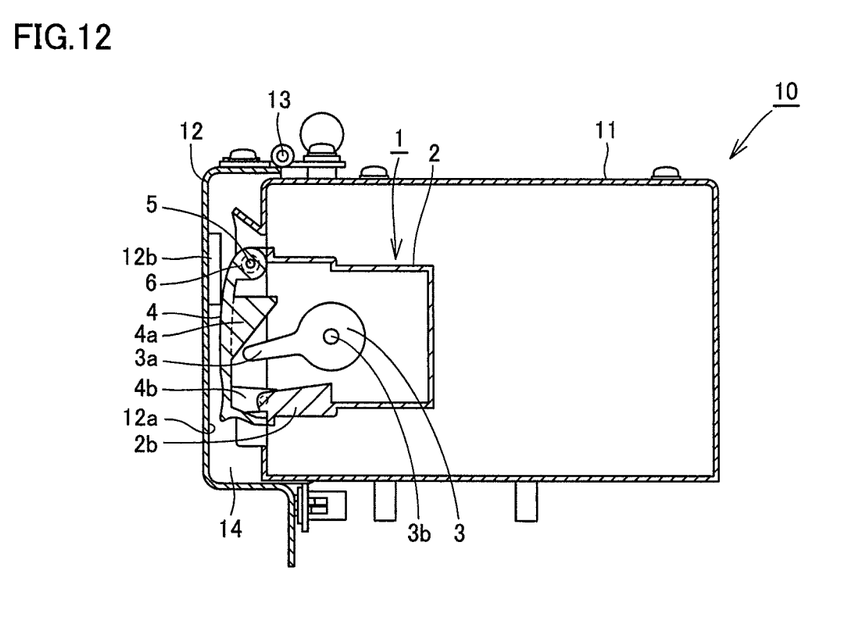
FIG. 12 is a side schematic view showing a seventh step of a series of steps for operating the engine-stop switch device in an embodiment of the present invention.

Referring to FIG. 12, when pivoting member 12 and operation unit cover 4 are pivoted and accordingly pivoting member 12 finally reaches its closed position, locking catch 4b of operation unit cover 4 engages with locking protrusion 2b of case 2. Accordingly, operation unit cover 4 at its position of covering operation lever 3 is locked on case 2. In addition, tab 3a of operation lever 3 has been shifted to the first operational position. Accordingly, engine 25 is set in the state of being permitted to start. Further, in this state, elastic member 12b of pivoting member 12 contacts operation unit cover 4 to thereby make it possible to prevent operation unit cover 4 from rattling.

Next, functions and effects of the present embodiment will be described.

In the present embodiment, as shown in FIGS. 3 and 4, pivoting member 12 is pivoted about pivoting member's pivot shaft 13 which is located above operation unit cover 4. Therefore, even when pivoting member 12 is set at its opened position, pivoting member 12 can automatically be pivoted by its own weight to its closed position. Thus, even in the case where pivoting member 12 is set at its opened position and operation lever 3 is exposed from operation unit cover 4 and shifted to the second operational position to stop engine 25 from operating, pivoting member 12 can thereafter be moved automatically to its closed position after the lever is shifted. In this way, pivoting member 12 can be prevented from being forgotten to be closed.

As shown in FIG. 12, when pivoting member 12 is at its closed position, the closed space (space 14) in which operation unit cover 4 is accommodated is formed between pivoting member 12 and housing 11 and housing 11 covers the lateral sides and the top side of case 2. In this way, operation lever 3 can be prevented from getting wet in the rain.

As shown in FIG. 3, with both pivoting member 12 and operation unit cover 4 opened, operation lever 3 can be shifted to the second operational position to stop engine 25 from operating. In this state, engine 25 is inhibited from starting. Pivoting member 12, however, is automatically closed so that operation unit cover 4 is held at the position of covering operation lever 3 as shown in FIG. 12 and operation unit cover 4 in turn holds operation lever 3 at the first operational position. At this first operational position, engine 25 is permitted to start. Namely, even when operation lever 3 is set in the state of inhibiting engine 25 from starting, pivoting member 12 is automatically set at its closed position to shift operation lever 3 to the state of permitting engine 25 to start. Thus, in response to operator's operation of turning on the key switch, engine 25 is started, and therefore, the work vehicle will not be mistakenly identified as malfunctioning.

As shown in FIG. 6, when pivoting member 12 is opened to its maximum for exposing operation unit cover 4, pivoting member 12 is inclined, as seen in a side view, in the form of protruding frontward with respect to vertical line D extending across pivoting member's pivot shaft 13. Accordingly, even when pivoting member 12 is at the position of opening to its maximum for exposing operation unit cover 4, pivoting member 12 can automatically be pivoted by its own weight to its closed position.

As shown in FIGS. 7 to 11, the inner surface of pivoting member 12 has slide portion (flat surface) 12a along which operation unit cover 4 slides while pivoting member 12 is pivoted from its opened position to its closed position. Thus, pivoting member 12 can be pivoted from its opened position to its closed position to cause operation unit cover 4 to also be moved from the position of exposing operation lever 3 to the position of covering operation lever 3 while sliding along pivoting member 12.

As shown in FIGS. 11 and 12, the inner surface of pivoting member 12 has flat surface 12a which is the slide portion as well as elastic member 12b located at a position closer to pivoting member's pivot shaft 13 than the position of slide portion 12a. In the closed state, elastic member 12b is in contact with operation unit cover 4. Thus, the slide portion can be provided in the foam of flat surface 12a to reduce the resistance while the cover is sliding along the slide portion. In addition, since the position of elastic member 12b is closer to pivoting member's pivot shaft 13 relative to the position of slide portion 12a, elastic member 12b contacts operation unit cover 4 when pivoting member 12 has been pivoted to its closed position. Thus, in the state where pivoting member 12 is at the position of being closed, operation unit cover 4 can be pressurized with the elastic force of elastic member 12b and accordingly operation unit cover 4 can be prevented from rattling. Moreover, since elastic member 12b pressurizes operation unit cover 4 and thereby lock operation unit cover 4 on case 2, the impact generated when it is locked can be alleviated by elastic member 12b.

As shown in FIG. 3, pivoting member 12 is shaped in such a manner that allows pivoting member 12 at its closed position to externally enclose the front side of the two lateral surfaces and the front side of the bottom portion of housing 11. Accordingly, it is possible to effectively prevent rain from directly entering the closed space (space 14, FIG. 12) in which operation unit cover 4 is accommodated and prevent rain from indirectly entering the closed space after splashing up from the surface on which the device is mounted.

As shown in FIG. 1, driver seat 15 and engine-stop switch device 10 are covered from above by canopy 20a. Thus, even in a work vehicle in which engine-stop switch device 10 is likely to get wet in the rain, operation lever 3 can still be prevented from getting wet in the rain.

Figure 13:
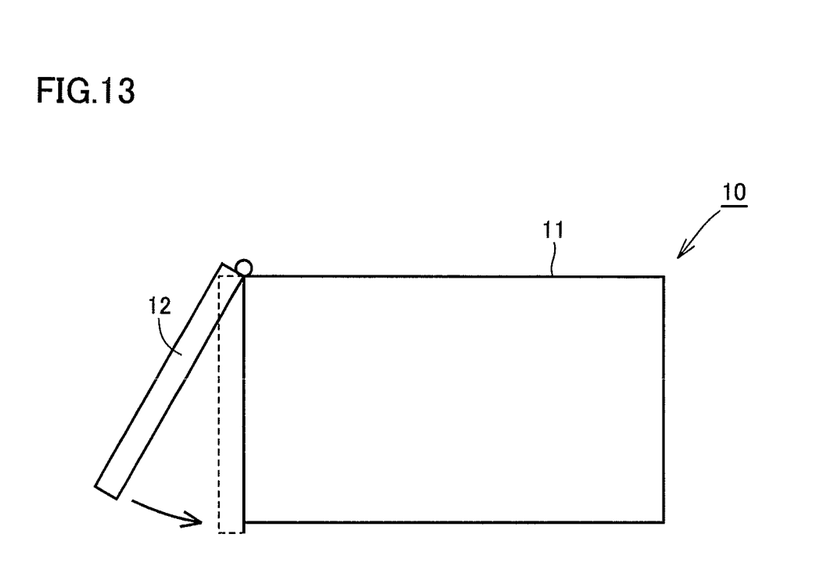
FIG. 13 is a side view schematically showing a configuration of an engine-stop switch device having a plate-shaped pivoting member according to a modification of the present invention.

While the above embodiment has been described in connection with the configuration where pivoting member 12 has flat plate portion 12c and frame portion 12d, pivoting member 12 may have a plate shape formed of only a flat plate portion as shown in FIG. 13.

In addition, while the above embodiment has been described in connection with the configuration where canopy 20a is provided as shown in FIG. 1, engine-stop switch device 10 of the present embodiment may also be applied to a work vehicle without canopy 20a or a work vehicle having a cab.

It should be construed that embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 switch body; 2 case; 2a opening; 2b locking protrusion; 3 operation lever; 3a tab; 3b operation lever's pivot; 4 operation unit cover; 4a sloped protrusion; 4b locking catch; 5 cover's pivot shaft; 6 torsion coil spring; 10 engine-stop switch device; 11 housing; 11a front wall; $11a_1$, $11d_1$ hole;

11b sidewall; 11c top wall; 11d rear wall; 11e bottom wall; 11f internal space; 12 pivoting member; 12a slide portion (flat surface); 12b elastic member; 12c flat plate portion; 12d frame portion; 13 pivoting member's pivot shaft; 14 space; 15 driver sheet; 16 driver sheet platform; 20a canopy; 20b pole; 21 front frame; 22 rear body; 22b engine compartment; 23 work implement; 23a boom; 23b bucket; 23c boom cylinder; 23d bell crank; 23e bucket cylinder; 23f link; 24a front wheel; 24b rear wheel; 25 engine; 26 control unit; 30 wheel loader

The invention claimed is:

1. A work vehicle comprising an engine and an engine-stop switch device of said work vehicle configured to stop said engine from operating, said engine-stop switch device including:
 a case;
 an operation unit attached to said case and moving, at a front side of said case, between a first operational position of permitting said engine to start and a second operational position of stopping said engine from operating and inhibiting said engine from starting;
 an operation unit cover moving between a position of covering said operation unit and a position of exposing said operation unit, and holding said operation unit at said first operational position while said operation unit cover is at the position of covering said operation unit;
 a housing covering lateral sides and a top side of said case that cross said front side of said case and exposing said operation unit cover from said front side; and
 a pivoting member pivoting about a pivoting member's pivot shaft located above said operation unit cover, between a closed position of covering said operation unit cover and an opened position of exposing said operation unit cover and, while said pivoting member is at said closed position, said pivoting member forming a closed space, between said pivoting member and said housing, for accommodating at least said operation unit cover in the closed space and holding said operation unit cover at said position of covering said operation unit.

2. The work vehicle according to claim 1, wherein said pivoting member at its position of opening to a maximum extent for exposing said operation unit cover protrudes in a direction of said front side and inclines with respect to a vertical line extending across said pivoting member's pivot shaft, as seen in a side view.

3. The work vehicle according to claim 1, wherein
 said pivoting member has an inner surface which is located opposite to said operation unit while said pivoting member is at said closed position, and
 said inner surface has a slide portion where said operation unit cover slides while said pivoting member is pivoted from said opened position to said closed position.

4. The work vehicle according to claim 3, wherein
 said inner surface has a flat surface which is said slide portion, and an elastic member located at a position closer to said pivoting member's pivot shaft relative to said slide portion, and
 said elastic member contacts said operation unit cover while being at said closed position.

5. The work vehicle according to claim 1, wherein said pivoting member is shaped to externally enclose said front side of lateral surfaces and said front side of a bottom portion of said housing while being at said closed position.

6. The work vehicle according to claim 1, further comprising:
 a driver seat; and
 a canopy covering from above said engine-stop switch device and said driver seat.

* * * * *